United States Patent
Nakajima et al.

(10) Patent No.: US 10,745,657 B2
(45) Date of Patent: Aug. 18, 2020

(54) MANUFACTURING METHOD FOR ETHANOL AQUEOUS SOLUTION

(71) Applicant: SUNTORY HOLDINGS LIMITED, Osaka (JP)

(72) Inventors: Mihoko Nakajima, Kanagawa (JP); Kazuyuki Torii, Osaka (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 97 days.

(21) Appl. No.: 15/514,546

(22) PCT Filed: Sep. 29, 2015

(86) PCT No.: PCT/JP2015/077431
§ 371 (c)(1),
(2) Date: Mar. 27, 2017

(87) PCT Pub. No.: WO2016/052462
PCT Pub. Date: Apr. 7, 2016

(65) Prior Publication Data
US 2017/0226452 A1 Aug. 10, 2017

(30) Foreign Application Priority Data

Sep. 30, 2014 (JP) .............................. 2014-202073

(51) Int. Cl.
| | |
|---|---|
| *C12G 3/04* | (2019.01) |
| *C12G 3/06* | (2006.01) |
| *A23G 4/06* | (2006.01) |
| *A23G 3/36* | (2006.01) |
| *A23G 9/32* | (2006.01) |
| *A23L 2/06* | (2006.01) |
| *C12H 6/02* | (2019.01) |

(52) U.S. Cl.
CPC ................ *C12G 3/04* (2013.01); *A23G 3/36* (2013.01); *A23G 4/06* (2013.01); *A23G 9/32* (2013.01); *A23L 2/06* (2013.01); *C12G 3/06* (2013.01); *C12H 6/02* (2019.02)

(58) Field of Classification Search
CPC ... C12G 3/04; C12G 3/00; C12G 3/06; C12G 3/12

USPC .................................................. 426/11, 592
See application file for complete search history.

(56) References Cited

U.S. PATENT DOCUMENTS

| | | | |
|---|---|---|---|
| 2,865,756 A | 12/1958 | Merory | |
| 2011/0059205 A1 | 3/2011 | Gaysinsky et al. | |

FOREIGN PATENT DOCUMENTS

| | | |
|---|---|---|
| DE | 10 2004 043972 A1 | 3/2006 |
| EP | 2 517 575 A1 | 10/2012 |
| JP | S55-081580 A | 6/1980 |
| JP | S61-35778 A | 2/1986 |
| JP | 2829407 B2 | 11/1998 |
| JP | 2002-125653 A | 5/2002 |
| JP | 2002125653 A * | 5/2002 |
| JP | 2004-018737 A | 1/2004 |
| JP | 2005-160329 A | 6/2005 |
| JP | 2005160329 A * | 6/2005 |
| WO | WO 2012/137629 A1 | 10/2012 |

OTHER PUBLICATIONS

Extended European search report dated Apr. 30, 2018 that issued in European patent application No. 15847297.7.
Shunsuke Miyaoka et al., "Production of the distilled liquor flavored with citrus fruits," *Ehime Prefecture Industrial Technology Institute Research Report*, 2013, No. 51, ISSN 1884-6874, pp. 1-8, including partial English language translation.
International Search Report dated Dec. 28, 2015 issued in PCT/JP2015/077431 filed Sep. 29, 2015.
European Office Action dated May 20, 2019 issued in European patent application No. 15847297.7.
Partial and machine English translation of JPS55-81580 A.

\* cited by examiner

*Primary Examiner* — Vera Stulii
(74) *Attorney, Agent, or Firm* — Faegre Drinker Biddle & Reath LLP

(57) ABSTRACT

The purpose of the present invention is to provide a simple method in which, when distilling a mixture of ethanol, water, and biological raw materials, more aromatic components can be obtained and undesirable odors can be prevented from transferring to the distillate. To achieve this, ethanol and water are added during distillation.

9 Claims, 2 Drawing Sheets

MANUFACTURING METHOD FOR ETHANOL AQUEOUS SOLUTION

This application is the National Stage of International Application No. PCT/JP2015/077431, filed Sep. 29, 2015, and claims benefit of Japanese Application No. 2014-202073 filed on Sep. 20, 2014.

TECHNICAL FIELD

The present invention relates to a method for producing ethanol aqueous solutions having the aroma of biological raw materials, as well as ethanol aqueous solutions obtained by the same, and others.

BACKGROUND ART

Methods are known by which essential oils or alcohol aqueous solutions containing aroma components such as fruits or fruit peels are produced through distillation. For example, Patent Document 1 discloses a method for producing distilled alcoholic beverages characterized in that the peels of fruits of citrus or apples in their raw form are immersed in alcohol and distilled under reduced pressure. Patent Document 2 discloses that efficient production of essential oils or floral water is possible by treating the lees of squeezed citrus juice with enzymes such as cellulase or pectinase and then performing distillation under reduced pressure.

As regards distillation, Patent Document 3 discloses a method of performing the same with part of the resulting liquid distillate being refluxed.

CITATION LIST

Patent Literature

Patent Document 1: Japanese Patent No. 4302871
Patent Document 2: JP 2004-18737 A
Patent Document 3: Japanese Patent No. 2829407

SUMMARY OF INVENTION

Technical Problem

In the case of distilling an ethanol aqueous solution that contains the aroma components of a biological raw material, low-boiling and stimulating components which tend to be distilled when the vapor has high alcohol-by-volume are the first to be distilled, then useful aroma components are distilled, and in the later stage of distillation, undesired smells such as a boiled-down smell or a burnt smell are generated. Hence, a method is in demand that not only requires minimum remodeling of facilities but which can also be operated simply to acquire the useful aroma components as much as possible from the biological raw material in a selective way while preventing the generation of said undesired smells.

Solution to Problem

As a result of intensive studies, the present inventors reached the idea that when a mixture of a biological raw material, ethanol and water is distilled and the liquid distillate is recovered as separated in specified amounts (called fractions), the sensory evaluation might vary from one fraction to another; based on this assumption, the present inventors analyzed their alcohol-by-volume, as well as the useful aroma components and undesired smell components, and performed sensory evaluation of those components. As the result, the present inventors have found that if ethanol and water are additionally supplied to the mixture of interest such that the ethanol concentration in the liquid distillate lies within a specified range at the time of its production, more of the desired aroma components can be acquired without increasing the transfer into the liquid distillate of highly stimulating components or undesired smells.

The present invention relates, but is not limited, to the following.

1. A method for producing an ethanol aqueous solution having an aroma of a biological raw material, comprising the steps of:
   subjecting a mixture of the biological raw material, first ethanol and first water to distillation, and
   adding second ethanol and second water to the mixture during the distillation, wherein after said addition, the ethanol concentration of a liquid distillate of the distillation as said liquid distillate is being produced is from 10 to 50%.
2. The method according to 1, wherein the addition of the second ethanol and the second water is initiated after the ethanol concentration of the liquid distillate has dropped to the range from 10 to 50%.
3. The method according to 1 or 2, wherein the addition of the second ethanol and the second water is initiated after the liquid distillate is produced in a volume which is from 0.10 to 0.75 times the total volume of the first ethanol and the first water.
4. The method according to any one of 1 to 3, wherein the second ethanol and the second water are added at a volume ratio of from 5:95 to 50:50.
5. The method according to any one of 1 to 4, wherein the total volume of the second ethanol and the second water is from 0.01 to 3 times the total volume of the first ethanol and the first water.
6. The method according to any one of 1 to 5, wherein the distillation is atmospheric distillation.
7. The method according to any one of 1 to 6, wherein the biological raw material is at least one member selected from among fruits, fruit peels, and herbs.
8. The method according to any one of 1 to 7, wherein the biological raw material is at least one member selected from among citrus fruits and peels of citruses.
9. An ethanol aqueous solution produced by the method according to any one of 1 to 8 above.
10. A beverage or a food containing the ethanol aqueous solution according to 9 above.

Advantageous Effects of Invention

The present invention enables biological raw materials to be distilled in such a way that more of aroma components are acquired while preventing the transfer of undesired smells to the liquid distillate. It is believed that such advantageous effects are not limited to the case using biological raw materials, ethanol, and water in the process of distillation. The present invention is based on the following idea: in the case of performing distillation on a three-component system consisting of a raw material containing useful component A, plus solvent B and solvent C, specifically in the case where a mixture of the raw material containing useful component A, plus solvents B and C is subjected to distillation, the percent recovery of A can be conveniently improved by maintaining the proportions of B and C in the mixture at such values that A will easily evaporate. In the Examples, A is linalool and the like that are contained in *Citrus junos*, and B and C are water and ethanol; it should however be noted that the raw material containing an effective component is not limited to a biological raw material such as *Citrus junos* and that the solvents might also be other than ethanol and water.

DESCRIPTION OF EMBODIMENTS

Figure 1:
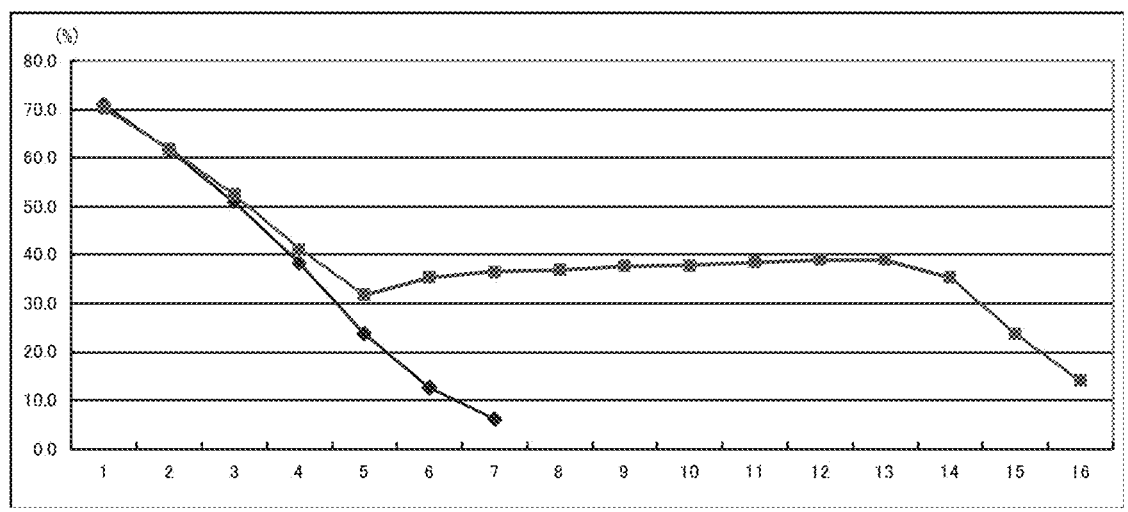
FIG. 1 is a graph showing the relation between the ethanol concentration of a liquid distillate and the fraction number; the vertical axis represents the ethanol concentration (%) and the horizontal axis represents the fraction number; ■ represents data for the method of the present invention and ◆ represents data for a control experiment.

The production method of the present invention and the ethanol aqueous solution obtained by the same are described below.

(Ethanol Aqueous Solution)

The term "ethanol aqueous solution" as used in the present invention means an aqueous solution that contains ethanol. In addition to ethanol and water, this aqueous solution may contain other components such as the aroma components of biological raw materials. Included within the scope of the ethanol aqueous solution are alcoholic beverages containing ethanol. Such alcoholic beverages may include whisky, brandy, shochu, gin, vodka, neutral spirits, fermented alcoholic beverages, etc.

(Raw Materials)

In the production method of the present invention, biological raw materials, ethanol, and water are used as raw materials.

The biological raw materials to be used in the present invention are not particularly limited and they may be plant raw materials or animal raw materials. Exemplary plant raw materials are fruits, fruit peels, herbs, grass roots/tree barks (e.g. perilla, cherry leaves, etc.), root vegetables, vegetables, spices, and raw materials to be roasted such as coffee. Preferred plant raw materials are fruits, fruit peels, and herbs. Exemplary animal raw materials are birds, cattle, pigs, and sheep. These may be used either independently or two or more kinds may be used in combination. The state of the biological raw materials is not restricted and they may be in any of the frozen, chilled or dried states. The moisture content of the biological raw materials is not limited, either.

The fruits and fruit peels to be used in the present invention are not particularly limited and examples include: fruits such as citruses (orange, mandarin orange, grapefruit, lemon, *Citrus junos*, lime, etc.), apples, grapes, muscat, cherry, melon, watermelon, cassis, peach, tropical fruits (pineapple, guava, banana, mango, acerola, papaya, passion fruit, etc.), and other fruits [ume, nashi, pear, apricot, plum, berries (including strawberry, juniper berry, cranberry, blueberry, raspberry, etc.), kiwi fruit, etc.]; and the peels of those fruits. These may be used either independently or two or more kinds may be used in combination. In the present invention, citrus fruits and/or the peels of citruses are preferably used. Since the aroma components of fruits are mostly abundant in the peels and the flesh in their vicinity, so it is preferred to use fruit peels as the starting raw material. The fruit peels may be used on their own or, alternatively, they may be used together with fruits or the flesh of the fruits.

The herbs to be used in the present invention are not particularly limited as long as they known as herbs and examples include perilla, Japanese pepper, tea (scientific name: *Camellia sinensis* (L.) *Kuntze*), cinnamon, coriander, etc. These may be used either independently or two or more kinds may be used in combination.

These biological raw materials may be preliminarily processed prior to distillation. For example, the biological raw materials may be subjected to distillation after being dried; alternatively, they may be used in their raw state without being dried. The biological raw materials are preferably used in their raw state. If desired, the biological raw materials may be shredded or frozen before distillation. What is more, the frozen product may be ground into particles. Alternatively, dregs that form when juice is squeezed from the biological raw materials may also be used as the raw material. In the present invention, two or more of those processing operations may be performed in combination.

The first ethanol and the first water are mainly used at the start of distillation. These may be separately mixed with the biological raw material or, alternatively, they may be preliminarily mixed together prior to mixing with the biological raw material. For example, the first ethanol and the first water may be in the form of an ethanol aqueous solution. In the present invention, the proportions of the first ethanol and the first water are not limited as long as the ethanol concentration of the liquid distillate that results after the step of addition lies within a specified range. However, the volume ratio of said ethanol to water is preferably from 5:95 to 99:1, more preferably from 5:95 to 80:20, even more preferably from 5:95 to 50:50, still more preferably from 10:90 to 40:60, and most preferably from 10:90 to 30:70. It should be emphasized here that in the present invention, as long as the mixture of the biological raw material, the first ethanol, and the first water is subjected to distillation, said mixture does not have to contain all of these components from the start of distillation (the start of generation of a liquid distillate). Ethanol and/or water may, for example, be added during distillation. Even in the case where the proportions of the first ethanol and the first water are limited to lie within any of the numerical ranges set out above, it sufficient that such proportions lie within said numerical ranges for at least a part, for example 50% or more, 60% or more, 70% or more, 80% or more, 90% or more, or 95% or more, of the period from the start of distillation until the start of the step of additionally supplying ethanol and water.

The second ethanol and the second water of interest may be added separately into the distillation system, or alternatively, they may be first mixed together and then added into the distillation system. In one example, the second ethanol and the second water may be in the form of an ethanol aqueous solution. In a further example, a liquid mixture of ethanol and water (e.g. ethanol aqueous solution) may be added together with water and/or ethanol. In the case where ethanol and water, and optionally a liquid mixture thereof are to be added separately, they may be added on different timings. However, the times of addition are preferably not separated by too large intervals. Preferably, they are added simultaneously. The second ethanol and the second water are preferably added at a volume ratio from 5:95 to 50:50, more preferably from 10:90 to 50:50, even more preferably from 20:80 to 50:50, and most preferably from 30:70 to 50:50.

The ethanol concentration of the ethanol aqueous solution obtained as the result of distillation is preferably 10-80%, more preferably 20-70%, and even more preferably 20-60%.

The ethanol concentration as referred to herein means v/v % and can be measured by any known method, for example with a vibrating densitometer. A specific way of determination is as follows: the ethanol aqueous solution is optionally filtered or freed of carbon dioxide gas by sonication, to prepare a sample; the sample is then distilled on direct fire and the resulting distillate is measured for density at 15° C., which is converted to a corresponding value of alcohol content in accordance with "Table 2: Conversion Tables for Alcohol Content Relative to Density (15° C.) and Specific Gravity (15/15° C.)", an annex to the National Tax Agency's Official Methods of Analysis (Heisei 19 Instructions from National Tax Agency, volume 6, revised on Jun. 22, 2007). The volume ratio of the first ethanol, the first water, the second ethanol, and the second water can be determined by measuring their respective volumes if they are yet to be mixed. But once they are mixed, measuring the ethanol concentration of the liquid mixture will suffice. The method to this end has been described above.

(Distillation)

To begin with, the biological raw material, the first ethanol, and the first aqueous solution are mixed. This mixing step may be performed within a vessel to be heated during distillation (e.g. still); alternatively, part or all of the starting materials may be mixed and the resulting mixture may be charged into the vessel. The ratio at which the biological raw material, the first ethanol, and the first water are mixed is not particularly limited but in one example, the biological raw material may be used in 0.5-50% (w/v), 10-50% (w/v), or 20-30% (w/v) of the total amount of the first ethanol and the first water. In addition to the biological raw material, ethanol, and water, the mixture obtained by the mixing step may contain other components as long as they do not adversely affect the advantageous effects of the present invention. For example, in order to supply ethanol and water, an ethanol aqueous solution may be used and this may be an alcoholic beverage. If desired, fermented mash may also be used as an alcoholic beverage.

Subsequently, said mixture is heated to start distillation. Distillation may be performed under reduced pressure or it may be performed at atmospheric pressure (without any processing to reduce or increase the pressure). Preferably, distillation is performed by heating at atmospheric pressure. The pressure to perform distillation is typically from 95 kPa to 106 kPa.

The method of the present invention is typically performed using a pot still and may also be carried out with a tray tower being installed on the top of the still.

The mixture of interest is heated to generate vapor and using a cooler, the vapor is condensed to produce a liquid distillate. Subsequently, while distillation continues, the second ethanol and the second water are added to the mixture. After the addition, the ethanol concentration of the liquid distillate as it is being produced lies from 10 to 50%, preferably from 20 to 50%, more preferably from 30 to 50%, and most preferably from 30 to 40%. The ethanol concentration of the liquid distillate may temporarily lie within the stated numerical ranges but it preferably lies within those numerical ranges for the longest possible period. In one example, the liquid distillate having the ethanol concentration within the stated numerical ranges is produced in an amount which is preferably from 0.01 to 3 times, more preferably from 0.2 to 0.6 times, even more preferably from 1 to 0.6 times the total volume of the first ethanol and the first water.

The ethanol concentration of the liquid distillate means the ethanol concentration the liquid distillate has as it is being produced, and this is variable depending on the timing of its production. This concentration does not change greatly even if a certain amount of time lapses after the production of the liquid distillate, so the concentration at the time of its production can be estimated even by performing a measurement after the lapse of a certain amount of time, rather than immediately after the production. In one example, the liquid distillate is divided into relatively small amounts of fractions and the ethanol concentration of each fraction is measured, whereupon the ethanol concentration that the liquid distillate had when it was produced, or a value very close to that can be determined. If, on the other hand, the method of determination is not appropriate, for example, in the case where the liquid distillate is divided into relatively large amounts of fractions and the ethanol concentration of each fraction is measured or in the case where ethanol concentration measurement is conducted after a plurality of fractions having different ethanol concentrations are combined, the exact ethanol concentration of the liquid distillate at the time of its production sometimes fails to be obtained.

In the present invention, the second ethanol and the second water are "additionally supplied." This means adding fresh ethanol and water. In other words, said additional supply does not mean returning the liquid distillate to the aforementioned mixture. Hence, the ethanol and water to be additionally supplied are different from the liquid distillate obtained during distillation. However, as long as the advantageous effects of the present invention are obtained, the scope of the present invention encompasses the additional supply of ethanol and water combined, combined with returning of the liquid distillate to the aforementioned mixture.

The additional supply of the second ethanol and the second water may be initiated when the ethanol concentration of said liquid distillate has dropped to the range from 10 to 50%. The ethanol concentration of said liquid distillate at the time when the additional supply is initiated is preferably from 20 to 50%, more preferably from 30 to 50%.

As an alternative or additional condition, the additional supply of the second ethanol and the second water may be initiated after the liquid distillate is produced in a volume which is 0.10 to 0.75 times the total volume of the first ethanol and the first water. The weight of the liquid distillate that has been produced at the start of the additional supply is preferably from 0.10 to 0.50 times, more preferably from 0.10 to 0.30 times the total volume of the first ethanol and the first water.

The total volume of the second ethanol and the second water to be additionally supplied is preferably from 0.01 to 3 times, more preferably from 0.2 to 0.6 times the total volume of the first ethanol and the first water.

The resulting liquid distillate can be used in foods or beverages. Hence, all fractions of the liquid distillate obtained may be used en masse; alternatively, the fractions having an undesirable smell may be excluded so that only the desirable fractions are collected for subsequent use. To this end, one may collect only those fractions which were obtained when the ethanol concentration of said liquid distillate at the time of its production was from 10 to 50%, preferably from 20 to 50%, more preferably from 30 to 50%, and most preferably from 30 to 40%. Depending on the case, one may use the fractions that were obtained before the ethanol concentration of said liquid distillate at the time of its production dropped to lie within said ranges.

(Use of the Ethanol Aqueous Solution)

The ethanol aqueous solution as the resulting liquid distillate may be drunk either as such or after being diluted with water or ethanol. In that case, an additional component such as sugar, liquid sugar or acidulant may be added depending on the need. Alternatively, said ethanol aqueous solution may also be added to beverages or foods. Examples of such beverages or foods include: beverages including alcoholic beverages such as shochu-based beverages, as well as carbonated drinks, fruit drinks, and teas; and foods such as ice cream, cakes, candies, chew gum, confectioneries, breads, etc. There are no particular limitations on the amount in which said ethanol aqueous solution is added and its amount is determined by the extent and preference of the aroma to be imparted.

(Numerical Ranges)

For the purpose of clarity, it should be noted that whenever a numerical range is defined herein by its lower and upper limits and expressed as "from the lower limit to the upper limit," both the lower and upper limits are included. For example, the range expressed as "from 1 to 2" includes 1 and 2.

EXAMPLES

On the following pages, the present invention will be described by reference to Examples but it is no means limited by these Examples.

Example 1

Using the peels of *Citrus junos*, atmospheric distillation was performed. Two approaches were adopted, the method of the present invention in which ethanol and water were additionally supplied, and a control experiment involving no such additional supply. Apparatuses such as a still, a cooling tower, and a vessel for recovering a liquid distillate were identical to those commonly used.

In each of the present invention and the control experiment, a mixture of 110 g of the peels of *Citrus junos* and 600 ml of a neutral spirit (containing 15% ethanol) was used as the raw material. The peels of *Citrus junos* were charged frozen into the still. Subsequently, the still was heated to start distillation.

In the control experiment, a liquid distillate was acquired in 30-ml portions to obtain a total of 6 fractions. The subsequently obtained liquid distillates were discarded because their ethanol concentrations were less than 10% and had an excessive boiled-down or burnt smell.

In the method of the present invention, too, a liquid distillate was acquired in 30-ml portions, giving a total of 16 fractions. The subsequently obtained liquid distillates were discarded because their ethanol concentrations were less than 10% and had an excessive boiled-down or burnt smell. The additional supply of ethanol and water was initiated during acquisition of Fraction 5 and ended after the acquisition of Fraction 12. The liquid distillate at the start of the additional supply had an ethanol concentration of about 35%. The amount of the liquid distillate that had been distilled by the time the additional supply was initiated was about 120 ml. The additionally supplied ethanol and water were in the form of an ethanol aqueous solution, specifically, a neutral spirit (containing 40% ethanol). Each time 30 ml of the liquid distillate was obtained, 30 ml of a neutral spirit was added up to a total of 9 times (270 ml). In the process of such additional supplies, the ethanol concentration of the liquid distillate was from 31.8% to 39.0%.

Three trained panelists conducted a sensory evaluation for the aroma of each fraction, in which the characteristics of the aroma of *Citrus junos* was evaluated for intensity and their scores were determined upon mutual consultation. The criteria for evaluation were as follows. These were also adopted in other Examples.

Score 5: The characteristics of *Citrus junos* are sensed strongly.

Score 4: The characteristics of *Citrus junos* are sensed somewhat strongly.

Score 3: The characteristics of *Citrus junos* are sensed.

Score 2: The characteristics of *Citrus junos* are sensed slightly.

Score 1: No characteristics of *Citrus junos* are sensed.

The results of evaluation are shown in Tables 1 and 2. These tables also list the ethanol concentration and comments. As for the control experiment, only the results of evaluation on the mixture of all fractions (Fractions 1-6) are cited. Shown in FIG. 1 are the fraction numbers in the respective experiments and the ethanol concentration of each fraction.

TABLE 1

Results of the control experiment using *Citrus junos*

| | Ethanol concentration | Sensory score | Comments |
|---|---|---|---|
| Mixture of all fractions | 43.0% | 2 | Being masked by the citrus sharp flavor, the taste and juiciness that were Characteristic of *Citrus junos* were very hard to sense. |

TABLE 2

Experimental results for the present invention's method using *Citrus junos*

| Fraction No. | Ethanol concentration | Sensory score | Comments |
|---|---|---|---|
| 1 | 70.2% | 1 | A sharp top note common to citruses was sensed. |
| 2 | 61.8% | 2 | A soft citrus aroma like that of *Citrus junos* oil began to develop slightly in the top note. |
| 3 | 52.4% | 3 | A soft citrus aroma like that of *Citrus junos* oil became somewhat intense in the top note. |
| 4 | 41.2% | 5 | A common aroma to citruses contained a soft citrus flavor like that of *Citrus junos* oil and even marked juiciness that was characteristic of *Citrus junos* began to develop and the flavor of *Citrus junos* was sensed strongly. |
| 5 | 31.8% | 5 | The characteristic aroma of *Citrus junos* was sensed strongly as above, but the alcohol by volume decreased in the overshoot and a boiled-down sensation, although very slight, developed. Additional supply of an ethanol aqueous solution started. |

TABLE 2-continued

Experimental results for the present invention's method using *Citrus junos*

| Fraction No. | Ethanol concentration | Sensory score | Comments |
|---|---|---|---|
| 6 | 35.4% | 5 | The characteristic aroma of *Citrus junos* oil and a quality that was characteristic of clear *Citrus junos* juice began to change slightly to a citrus aroma like that of candies. Since the alcohol by volume increased, the boiled-down aroma somewhat leveled off and was not sensed. |
| 7 | 36.5% | 5 | The characteristics of *Citrus junos* were distinct and as the ethanol concentration increased, the boiled-down sensation disappeared, too. |
| 8 | 36.8% | 4 | The note of *Citrus junos* weakened slightly. |
| 9 | 37.7% | 4 | The note of *Citrus junos* gradually changed to a candy-like heavy aroma but the flavor of *Citrus junos* was sensed solidly. |
| 10 | 37.8% | 4 | The note of *Citrus junos* weakened slightly but a quality that was characteristic of *Citrus junos* adequately remained. |
| 11 | 38.4% | 3 | The note of *Citrus junos* weakened slowly. |
| 12 | 39.0% | 3 | The note of *Citrus junos* was gradually weakening. Additional supply of the ethanol aqueous solution ended. |
| 13 | 39.0% | 3 | An aroma like that of *Citrus junos* oil and a quality that was characteristic of clear *Citrus junos* juice changed to a citrus aroma like that of candies, and even a boiled-down aroma gradually became to be sensed. |
| 14 | 35.3% | 3 | A gradually distinct boiled-down sensation was developing. |
| 15 | 23.6% | 3 | A boiled-down sensation developed. |
| 16 | 14.0% | 2 | An unclean body and a boiled-down sensation developed. |
| Mixture of all fractions | 39.4% | 4 | With a quality characteristic of *Citrus junos* being distinct, there was a good balance between the development of a top note like that of *Citrus junos* oil and a *Citrus junos* flavor with a juicy taste. A mild and sweet taste that was reminiscent of the albedo, endocarps and juice vesicles of *Citrus junos* was particularly strong. |

As is clear from Tables 1 and 2 and FIG. 1, the method of the present invention, in which ethanol and water were additionally supplied, enabled the ethanol concentration of the liquid distillate to be maintained at from 10 to 50% for a longer period than in the control experiment. Consequently, according to the method of the present invention, excessive development of undesirable aromas such as a boiled-down smell and a burnt smell could be delayed. In addition, as is clear from the comments and sensory evaluations cited in Table 2, a lot of desired fractions containing the aroma of *Citrus junos* could be acquired. And the mixture comprising all of the fractions acquired in the method of the present invention strongly exhibited the characteristics of the aroma of *Citrus junos* as compared with the control.

Figure 2:
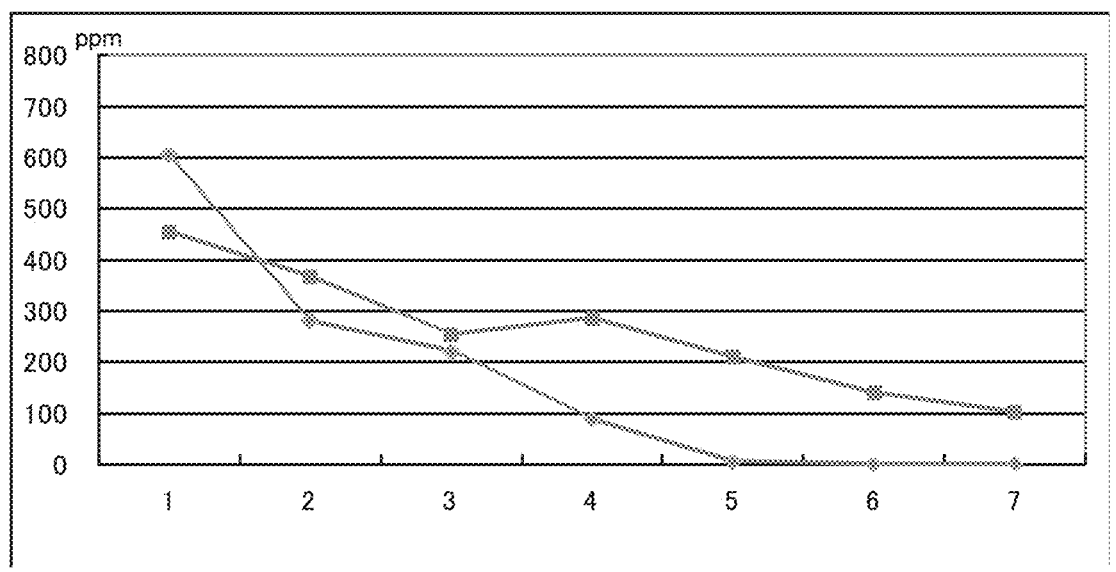
FIG. 2 is a graph showing the concentrations (ppm) of limonene and linalool in each of the fractions obtained in the control experiment; the vertical axis represents the concentration and the horizontal axis represents the fraction number; ◆ represents the concentration of limonene and ■ represents a numerical value obtained by multiplying the concentration of linalool by a factor of 10.
Figure 3:
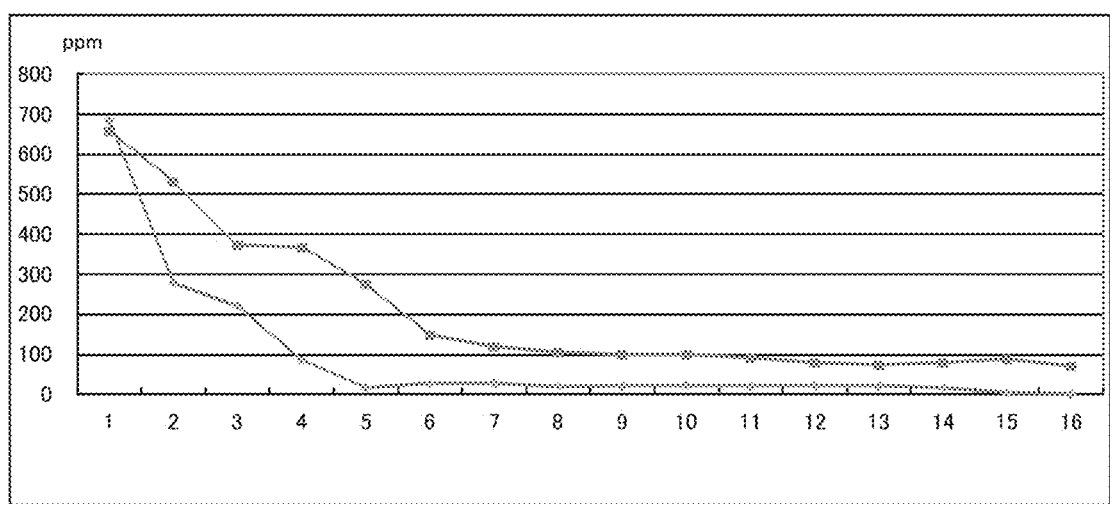
FIG. 3 is a graph showing the concentrations (ppm) of limonene and linalool in each of the fractions obtained by the present invention's method; the vertical axis represents the concentration and the horizontal axis represents the fraction number; ◆ represents the concentration of limonene and ■ represents a numerical value obtained by multiplying the concentration of linalool by a factor of 10.

From these facts, the method of the present invention is considered to enable more of the aroma components of biological raw materials to be acquired selectively. To verify this in greater detail, each of the fractions was determined for the contents of limonene and linalool as primary aroma components of *Citrus junos* and comparison was made. For the purpose of measurement, the gas chromatography (GLC) technology was used. The results are shown in FIGS. 2 and 3. FIG. 2 shows the results of the control experiment. The acquisition of limonene (♦) and linalool (■) ended with Fraction 7 due to excessive development of a boiled-down smell and a burnt smell. In contrast, FIG. 3 shows the results from the method of the present invention. Before excessive development of the boiled-down smell and the burnt smell, a lot of fractions could be acquired that contained limonene (♦) and linalool (■) (up to Fraction 16). Consequently, greater amounts of limonene and linalool could be obtained than in the control.

The total amounts of the respective components as acquired in each experiment are shown in Table 3.

TABLE 3

Acquisition amounts of respective components

| | Control experiment | Present invention | Present invention/Control experiment |
|---|---|---|---|
| Liomonene | 38.38 mg | 47.23 mg | 123.1% |
| Linalool | 5.31 mg | 9.94 mg | 187.2% |

Reference Example

For the sake of comparison, rectifier-based distillation was conducted. Rectifier-based distillation is a method of distillation in which part of a liquid distillate is returned to the neck of a still.

Except for refluxing part of a liquid distillate, the operation of the control of Example 1 was repeated using the same raw material as in the control experiment.

In this Reference Example, a liquid distillate was acquired in 30-ml portions to obtain a total of 11 fractions. The subsequently obtained liquid distillate was discarded.

As in Example 1, sensory evaluation was conducted for the aroma of each fraction. The results are shown in Table 4.

TABLE 4

Experimental results for rectifier-based distillation using *Citrus junos*

| Fraction No. | Ethanol concentration | Sensory score | Comments |
|---|---|---|---|
| 1 | 84.9% | 3 | Only a sharp top note common to citruses developed. |
| 4 | 92.7% | 3 | Same as above. No characteristic aroma of *Citrus junos* was sensed. |
| 5 | 92.3% | 3 | Same as above. No characteristic aroma of *Citrus junos* was sensed. |
| 8 | 90.1% | 3 | Same as above. No characteristic aroma of *Citrus junos* was sensed. |
| 9 | 86.9% | 4 | A refreshing *Citrus junos* aroma was sensed in the top note common to citruses. |
| 10 | 41.7% | 4 | A juice-like *Citrus junos* aroma was also sensed. |
| 11 | 5.4% | 2 | The sensation of *Citrus junos* weakened and even a boiled-down sensation developed. |
| Mixture of all fractions | 39.4% | 3 | The aroma of *Citrus junos* was sensed in a distinct citrus aroma but the so-called citrus aroma was so predominant that the aroma of *Citrus junos* was unnoticeable. |

As is clear from Table 4, there were not many fractions that strongly displayed the characteristics of the aroma of *Citrus junos* and the mixture of all fractions also had inferior results of evaluation than in the present invention. This demonstrates that the aroma components of *Citrus junos* were acquired in smaller amounts.

Example 2

Using the peels of grapefruit, atmospheric distillation was performed. Two approaches were adopted, the method of the present invention in which ethanol and water were additionally supplied, and a control experiment involving no such additional supply. The procedure of each experiment was essentially the same as what was described in Example 1, except that the peels of grapefruit were used as a raw material and that the operation scale was reduced by half.

In each of the present invention and the control experiment, a mixture of 55 g of the peels of grapefruit and 300 ml of a neutral spirit (containing 15% ethanol) was used as the raw material.

After distillation was initiated in the control experiment, a liquid distillate was acquired in 15-ml portions to obtain a total of 7 fractions. The subsequently obtained liquid distillates were discarded.

In the method of the present invention, too, a liquid distillate was acquired in 15-ml portions, yielding a total of 17 fractions. The subsequently obtained liquid distillates were discarded. The additional supply of ethanol and water was initiated after the collection of Fraction 4 and ended after the acquisition of Fraction 12. The liquid distillate at the start of the additional supply had an ethanol concentration of about 42%. The amount of the liquid distillate that had distilled by the time the additional supply was initiated was about 60 ml. The additionally supplied ethanol and water were in the form of an ethanol aqueous solution, specifically, a neutral spirit (containing 40% ethanol). Each time 15 ml of the liquid distillate was obtained, 15 ml of a neutral spirit was added up to a total of 9 times (135 ml). In the process of such additional supplies, the ethanol concentration of the liquid distillate was from 32.8% to 38.4%.

Sensory evaluation was conducted for the aroma of individual fractions as in Example 1. The results of evaluation are shown in Tables 5 and 6. As for the control experiment, only the results of evaluation on the mixture of all fractions (Fractions 1-7) are cited.

TABLE 5

Results of the control experiment using grapefruit

| | Ethanol concentration | Sensory score | Comments |
|---|---|---|---|
| Mixture of all fractions | 42.2% | 3 | The characteristics of grapefruit were somewhat difficult to sense, partly because they were relatively masked. |

TABLE 6

Experimental results for the present invention's method using grapefruit

| Fraction No. | Ethanol concentration | Sensory score | Comments |
|---|---|---|---|
| 1 | 60.6% | 3 | A light, refreshing aroma of citruses developed. The aroma of grapefruit was somewhat sensed. |
| 2 | 65.2% | 4 | The light, refreshing aroma of citruses leveled off a bit and the sensation of grapefruit that could be sensed slowly increased in intensity. |
| 3 | 56.2% | 5 | The aroma common to citruses was lighter than that of lemon. The refreshing aroma of citruses leveled off a bit and the sensation of grapefruit was sensed strongly. |
| 4 | 47.5% | 5 | The refreshing aroma of citruses and the juice-like sensation of grapefruit were intense. |
| 5 | 38.4% | 5 | The refreshing aroma of citruses and the juice-like sensation of grapefruit were sensed. |
| 6 | 33.8% | 5 | The refreshing aroma of citruses and the juice-like sensation of grapefruit were sensed. |
| 7 | 32.8% | 4 | The sensation of grapefruit slightly weakened. |
| 8 | 33.6% | 4 | The sensation of grapefruit gradually weakened. Even a boiled-down sensation developed slightly. |
| 9 | 33.2% | 4 | The sensation of grapefruit gradually weakened. Even a boiled-down sensation developed slightly. |
| 10 | 32.8% | 4 | The top refreshing sensation of grapefruit diminished and the juice-like sensation of grapefruit became predominant. |
| 11 | 34.5% | 4 | The top refreshing sensation of grapefruit diminished and the juice-like sensation of grapefruit became predominant. |
| 12 | 35.3% | 4 | A quality characteristic of grapefruit still remained. A somewhat sweet and heavy sensation developed. |
| 13 | 35.0% | 4 | A quality characteristic of grapefruit still remained. A somewhat sweet and heavy sensation developed. |
| 14 | 30.0% | 3 | A quality characteristic of grapefruit still remained. A somewhat sweet and heavy sensation developed. The total quantity decreased by small degrees. |
| 15 | 23.0% | 3 | A quality characteristic of grapefruit still remained. A somewhat sweet and heavy sensation developed. The total quantity was decreasing by small degrees. |
| 16 | 18.6% | 2 | A boiled-down smell and a heavy smell were sensed. |
| 17 | 11.7% | 2 | An intense boiled-down sensation developed. |
| Mixture of all fractions | 36.6% | 4 | In addition to the refreshing top note of citruses, a somewhat juice-like flavor was sensed, as from the albedo and endocarps that were unique to grapefruit. |

Tables 5 and 6 showed the same tendency as in Example 1. In other words, according to the present invention, development of undesirable aromas such as a boiled-down smell and a burnt smell could be delayed. What is more, in the present invention, while the ethanol concentration of the liquid distillate was maintained from 10 to 50%, a lot of desired fractions containing the aroma of grapefruit could be acquired. And the mixture comprising all fractions of the liquid distillate strongly exhibited the characteristics of the aroma of grapefruit as compared with the control.

In each experiment, the total acquisition amounts of linalool and citral as primary aroma components of grapefruit were determined. The results are shown in Table 7. The present invention provided more of those components in comparison with the control experiment.

TABLE 7

| | Acquisition amounts of respective components | | |
|---|---|---|---|
| | Control experiment | Present invention | Present invention/ Control experiment |
| Linalool | 0.29 mg | 0.36 mg | 124% |
| Citral | 0.28 mg | 0.40 mg | 143% |

From the foregoing results, it became clear that the method of the present invention enables more of the aroma components of biological raw materials to be acquired without increasing the transfer of undesired smells to a liquid distillate.

The invention claimed is:

1. A method for producing an ethanol aqueous solution having an aroma of a plant raw material using distillation, comprising the steps of:
    a first step comprising distilling a mixture of an amount of plant raw material, a first amount of ethanol and a first amount of water, and
    a second step of adding
        (a) a composition consisting of a second amount of ethanol and a second amount of water to the mixture during a remainder of the distillation, or
        (b) separately adding only a second amount of ethanol and a second amount of water, to the mixture during a remainder of the distillation,
    to form a liquid distillate,
    wherein after the second step, an ethanol concentration of the liquid distillate at the time of the liquid distillate's production is from 10 to 50%.

2. The method according to claim 1, wherein the addition of the second amount of ethanol and the second amount of water is initiated after the ethanol concentration of the liquid distillate has dropped to the range from 10 to 50%.

3. The method according to claim 1, wherein the addition of the second amount of ethanol and the second amount of water is initiated after the liquid distillate is produced in a volume from 0.10 to 035 times the total volume of the first amount of ethanol and the first amount of water.

4. The method according to claim 1, wherein the second amount of ethanol and the second amount of water are added at a volume ratio of from 5:95 to 50:50.

5. The method according to claim 1, wherein the total volume of the second amount of ethanol and the second amount of water is from 0.01 to 3 times the total volume of the first amount of ethanol and the first amount of water.

6. The method according to claim 1, wherein the distillation pressure is atmospheric pressure.

7. The method according to claim 1, wherein the plant raw material is selected from a group consisting of: fruits, fruit peels, herbs, and a combination thereof.

8. The method according to claim 1, wherein the plant raw material is selected from a group consisting of citrus fruits, peels of citruses, and a combination thereof.

9. The method according to claim 1, wherein the second step consists of adding the composition consisting of the second amount of ethanol and the second amount of water to the mixture during the remainder of the distillation.

* * * * *